July 2, 1935. M. BABENCO ET AL 2,006,784
CHANGING OF SPEED OF MOTOR CARS AND THE LIKE
Filed Sept. 30, 1932 2 Sheets-Sheet 1
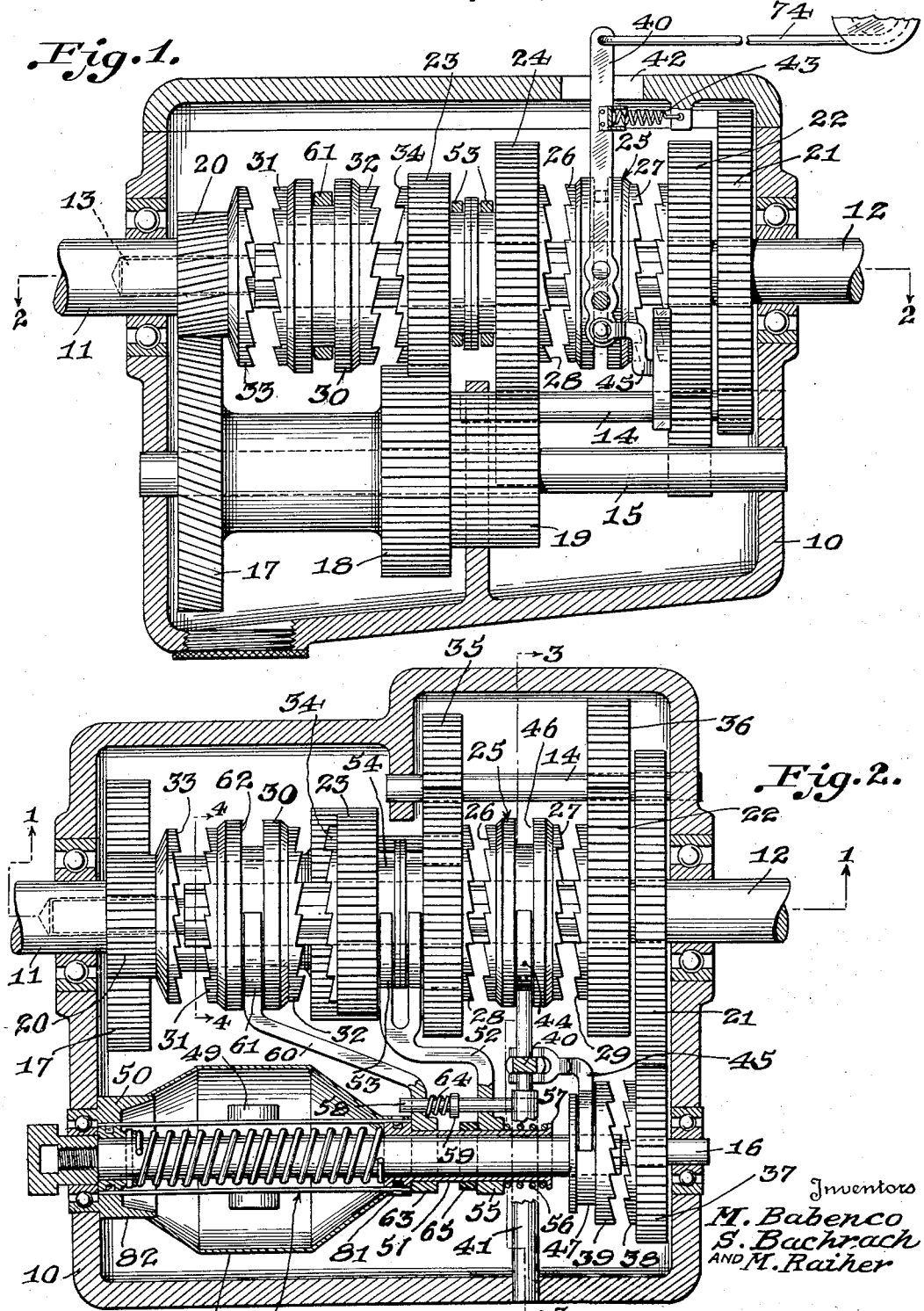

July 2, 1935.  M. BABENCO ET AL  2,006,784
CHANGING OF SPEED OF MOTOR CARS AND THE LIKE
Filed Sept. 30, 1932  2 Sheets-Sheet 2
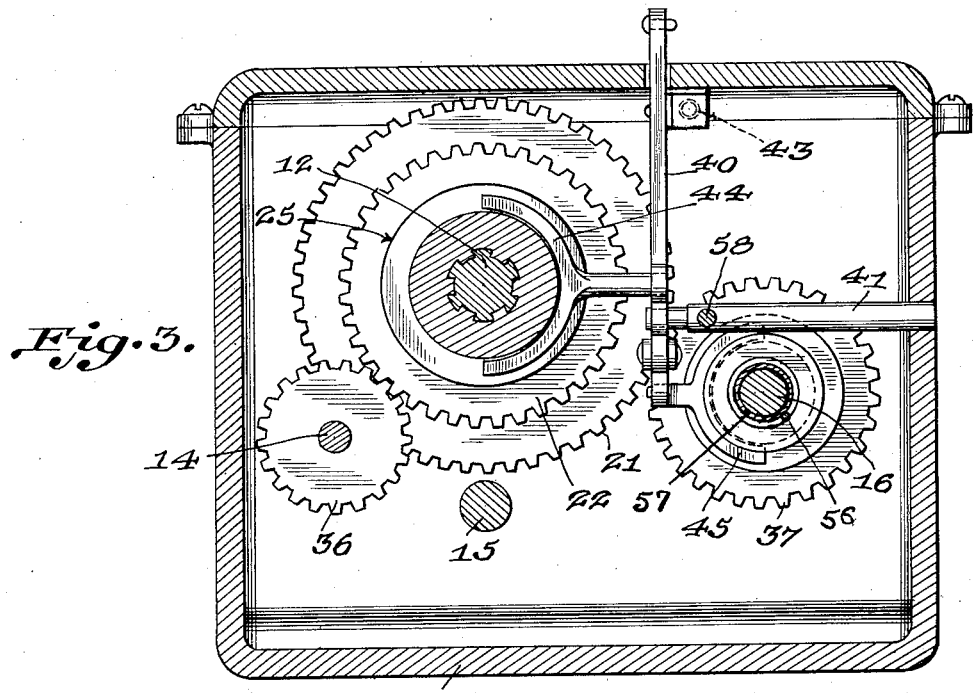
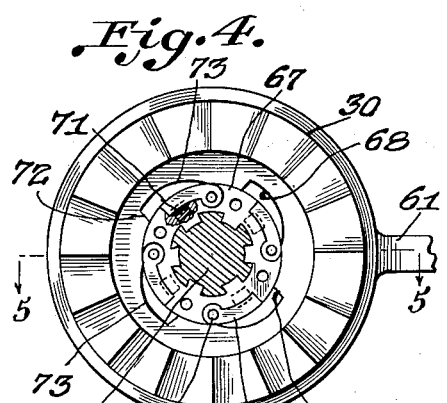
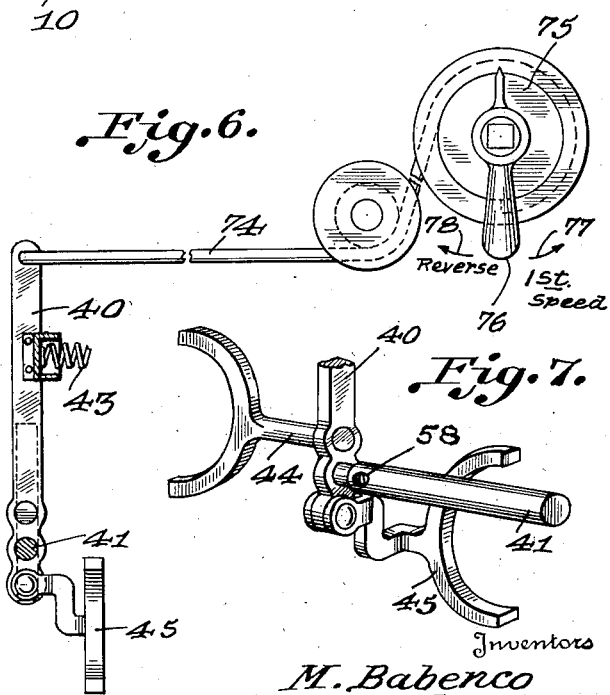
Inventors
M. Babenco
S. Bachrach
AND M. Raiher
By Glascock Downing & Seebold
Attorneys Patented July 2, 1935

2,006,784

UNITED STATES PATENT OFFICE 2,006,784

CHANGING OF SPEED OF MOTOR CARS AND THE LIKE

Mauricio Babenco, Selik Bachrach, and Mordco Raiher, Buenos Aires, Argentina

Application September 30, 1932, Serial No. 635,694

3 Claims. (Cl. 74—336.5)

This invention relates to improvements in power transmission mechanisms and more particularly to a mechanism of this character for changing gear ratios.

The object of the invention is to provide a simple and compact change speed gear in which the gear ratios are varied in dependence on the speed of the driven shaft.

In the accompanying drawings wherein an approved embodiment of the invention is illustrated:

Figure 1 is a vertical sectional view on the line 1—1 of Fig. 2.

Fig. 2 is a horizontal sectional view on the line 2—2 of Fig. 1.

Fig. 3 is a vertical sectional view on the line 3—3 of Fig. 2.

Fig. 4 is a detail sectional view on the line 4—4 of Fig. 2.

Fig. 5 shows details of the free wheeling clutch.

Fig. 6 is a detail view in elevation of the controlling means for the change speed gear.

Fig. 7 is a fragmentary perspective view of the main controlling lever of the mechanism.

Referring to the drawings in detail the numeral 10 indicates the gear casing rotatably supporting one end of the drive shaft 11 and the adjacent end of the driven shaft 12 which latter is rotatable independently of the drive shaft 11 and is provided with a reduced forward end 13 rotatably mounted therein.

A reverse drive shaft 14, counter-shaft 15 and governor 16 are also mounted in the casing 10.

The counter-shaft 15 carries three gear wheels 17, 18, and 19 all rigidly coupled, one with the other and the gear wheels 18 and 19 being of sufficient width to accommodate axial movement of the gear wheels which mesh therewith. Movement of the drive shaft 11 is transmitted to the gear wheel 17 through a gear wheel 20 fixed to said drive shaft.

A gear wheel 21 for driving the governor which will be hereinafter more fully described, is fixed to the driven shaft 12 and immediately adjacent thereto a gear wheel 22 is rotatably mounted on the driven shaft 12 for imparting rotary movement to the latter in the reverse direction, as will hereinafter appear. The rear wheels 18 and 19 are for the intermediate and low speed drive respectively, and they are constantly in mesh with the pinion gear wheels 23 and 24 rotatably and axially movable on the driven shaft 12.

A double acting clutch member 25 is slidably keyed on the driven shaft 12 between the gear wheels 22 and 24 and the opposite toothed faces 26 and 27 thereof are adapted to cooperate with corresponding toothed clutch members 28 and 29 rigidly secured to the gear wheels 24 and 22.

A second double acting clutch member 30 is slidably and non-rotatably keyed on the portion of the driven shaft 12 intermediate the gear wheels 20 and 23 and the opposite toothed clutch members 31 and 32 thereof are engageable with the toothed clutch members 33 and 34 rigidly fixed to the gear wheels 20 and 23, respectively.

The reverse drive shaft 14 is coupled with the low speed gear wheel 19 by a gear wheel 35 and movement of said shaft 14 is transmitted to the gear wheel 22 through the gear wheel 36.

The gear wheel 21 fixed to the driven shaft 12 meshes with a gear wheel 37 loosely mounted on the governor shaft 16, the gear wheel 37 being provided with the toothed clutch member 38 engageable by a correspondingly toothed clutch member 39 slidably keyed on the shaft 16 whereby when the two clutch members 38 and 39 are engaged, rotary movement of the driven shaft 12 is transmitted to the governor shaft 16.

A main control lever 40 is pivotally mounted on a post 41 fixed in the casing 10 and projects exteriorly of the latter through a slot 42, the lever being normally urged toward the left in Fig. 1 by an expansion spring 43. Above and below its pivotal mounting 41 the lever 40 is pivotally connected with yokes 44 and 45, the yoke 44 engaging a groove 46 in the clutch member 25, and the yoke member 45 engaging a groove 47 in the slidable clutch member 39 whereby when the lever 40 is shifted from one position to the other, the two yokes 44 and 45 are shifted in opposite directions.

The governor shaft 16 supports a governor designated generally at 48 and consisting of a plurality of weighted spring arms 49 secured at one end to a hub 50 rigidly attached to the shaft 16, the opposite end of the governor arms being secured to a tubular mantle 51 slidably mounted on the governor shaft 16.

An arm 52 is provided at one end with yokes 53 engaging grooves 54 provided between the gear wheels 23 and 24 and at its opposite end with a hub-like member 55 slidably and rotatably mounted on the tubular mantle 51. The hub member 55 is normally retained in a predetermined position on the tubular mantle 51 by a spring 56 secured at one end to said hub member and at its opposite end to the flanged terminal 57 of the tubular mantle 51. The movement of the arm 52 is guided by a pin 58 passing through an aperture in said arm and is limited by a stop collar 59 fixed to said pin.

A third arm 60 is provided at one end with a yoke 61 engaged in a groove 62 of the clutch member 30 and at its opposite end with the hub-like member 63 slidably and rotatably receiving the tubular mantle 51. The arm 60 is normally held in predetermined position by a spring 64 fixed at one end to said arm and at its opposite end to the collar 50. A collar 65 rigidly secured to the mantle 51 is brought into engagement with the hub member 63 as said mantle is moved axially under the influence of the centrifugal governor 48.

The clutch member 30 is connected with the driven shaft 12 by an over-run or free wheeling clutch illustrated in detail in Figs. 4 and 5 consisting of a hub member 67 keyed to the driven shaft 12 and rotatably mounted in the bore of the clutch member 30 in which a plurality of recesses 68 are formed coacting with pawls 69 pivotally mounted at 70 and normally pressed outwardly by springs 71. When the speed of the drive shaft 11 coupled with the driven shaft 12 through the clutch members 33 and 30 exceeds the speed of the driven shaft, the terminals of the pawls 69 forced outwardly by the springs 70 engage the shoulders 72 at the terminals of the recesses 68 and thereby form a positive driving connection between the clutch member 30 and the driven shaft 12. However, when the speed of the driven shaft exceeds that of the drive shaft, the clutch members 30 and 33 being still in coupled relation, the pawls 69 are pressed inwardly toward the center of the hub member 67 by the cam-like walls 73 of the recesses 68 and the driven shaft is thus allowed to revolve freely at a speed greater than that of the drive shaft.

The operation of the lever 40 is controlled by a cable 74 secured at one end to the upper extremity of the lever 40 and at its opposite end to a rotatable drum 75 adjustable by means of a handle 76. When the handle 76 is moved toward the right as indicated by the arrow 77, the cable 74 is unwound on the drum 75 and the lever 40 is moved by the expansion spring 43 to adjust the change speed mechanism to low gear or first speed. However, when the handle 76 is moved in the opposite direction indicated by the arrow 78, the lever 40 is moved against the tension of the spring 43 into position to effect the necessary connection for the reverse drive.

In operation, when the handle 76 is moved toward the right, Fig. 6, the lever 40 is pressed by the expansion spring 43 and moving about the pivot pin 41 actuates the yoke 44 so as to shift the clutch member 25 into engagement with the clutch member 28 thereby establishing a driving connection from the drive shaft 11 through the gear wheels 20, 17, 19 and 24 to the driven shaft 12 through the clutch members 28 and 25. Simultaneously with this operation, the yoke 45 is also shifted to engage the clutch member 39 with the clutch member 38 and thus the movement of the driven shaft 12 is transmitted to the governor shaft 16. As the speed of the driven shaft 12 increases, the speed of the governor 16 is correspondingly increased and as the arms 49 swing outwardly under the action of centrifugal force, the tubular mantle 51 is moved axially to the left and the spring 56 pressing against the hub member 55 displaces the arm 52 and the two gear wheels 23 and 24 toward the left whereby the clutch member 28 is disengaged from the clutch member 25 and a driving connection is established between the clutch member 34 and the clutch member 30. In this position, the driven shaft 12 is rotated from the drive shaft 11 through the gear wheels 20, 17, 18 and 23 and the clutch members 34 and 30.

At this stage in the operation of the mechanism the movement of the arm 52 is arrested by the collar 59 and during the further axial movement of the mantle 51 toward the left the spring 56 is compressed. Also during the above described operations, the arm 60 together with the clutch member 30 connected therewith are retained in the position shown in the drawings by the spring 64.

However, as the speed of the driven shaft increases and the arms 49 are extended to a greater extent by centrifugal force, the tubular mantle 51 is further displaced axially until the collar 65 rigid therewith engages the hub member 63 and displaces the arm 60 thereby disengaging the clutch member 30 from the clutch member 34 and establishing a direct driving connection between the drive shaft 11 and the driven shaft 12 through the clutch members 33 and 30.

When the speed of the driven shaft is progressively retarded, the foregoing operations are performed in reverse order as follows: The tubular mantle 51 is moved to the right and the arm 60 is restored to the position shown in the drawings by the tension of the spring 64 thereby returning the clutch member 30 into engagement with the clutch member 34 and reestablishing a driving connection from the drive shaft 11 through the gear wheels 20, 17, 18 and 23 to the driven shaft through the clutch member 34 and 30. Upon further retardation of the speed of the driven shaft, the movement of the tubular mantle 51 is imparted to the arm 52 through the spring 56 and the clutch member 30 is thereby disengaged from the clutch member 30 and driving connection between the drive shaft 11 and the driven shaft 12 is established through the gear wheels 20, 17, 19 and 24 and the clutch members 28 and 26. When the handle 76 is shifted to the position illustrated in Fig. 6, the lever 40 is so adjusted as to move the clutch member 25 to the neutral position in which neither of the toothed faces thereof engage either of the clutch members 28 or 29 and the clutch member 39 is withdrawn from the clutch member 38.

By shifting the handle 76 to the left, a pull is exerted on the cable 74 and the lever 40 is so moved as to engage the clutch member 27 with the clutch member 29 and thus a driving connection between the drive shaft and the driven shaft is established through the gear wheels 20, 17, 19, 35, 36 and 22 and the clutch members 29 and 25.

In order to protect the parts of the governor moving under the influence of centrifugal force from the detrimental effects of the relatively heavy lubricant ordinarily contained in the casings of gears of this type, a governor casing 80 is secured at 81 to the tubular mantle 51 and slides at its opposite end on the cylindrical external surface 82 of the hub member 50. The smooth internal surface of the casing 80 also acts to limit the outward swinging movement of the centrifugal arms 49 so that when the maximum speed of the governor shaft 16 is attained and the clutch members 30 and 33 have been engaged, the casing 80 prevents the arms from swinging outwardly to a greater extent.

What is claimed is:

1. In a change-speed gear, the combination of a driving shaft and a driven shaft, with a counter shaft, a governor shaft a centrifugal governor and a slidable mantle mounted thereon, low and intermediate speed gear wheels rotatable and slidable on the driven shaft, gear wheels connecting the drive shaft with the counter shaft and with the low and intermediate speed gear wheels, means for clutching the low speed gear wheel to said driven shaft, clutch means for selectively clutching the driven shaft to the intermediate speed gear wheel and to the drive shaft, means including an arm on the mantle actuated by said governor for directly shifting the low speed gear out of engagement with its clutching means and the intermediate speed gear wheel into engagement with the secondly mentioned clutch means, and an arm on the mantle controlled by said governor for directly shifting the secondly mentioned clutch means out of engagement with the intermediate speed gear wheel and into clutched relation with said drive shaft.

2. In a change-speed gear the combination of alined driving and driven shafts, with a governor shaft, a centrifugal governor and a slidable mantle mounted on the governor shaft, means controlled by the governor for actuating the mantle, intermediate clutching means slidably mounted on the driven shaft, an arm mounted on the mantle directly acting on the intermediate clutching means, intermediate and low speed gear wheels slidably and rotatably mounted on the driven shaft, arms mounted on the mantle directly acting on the intermediate and low speed gear wheels.

3. A mechanism as claimed in claim 1 including a casing enclosing the centrifugal governor for the purpose of limiting the external movement of the said governor and for preventing the lubricating oil of the speed gears from causing irregular operation of the governor.

MAURICIO BABENCO.
SELIK BACHRACH.
MORDCO RAIHER.